Apr. 3, 1923.
J. W. HILDRETH
FLYTRAP
Filed June 19, 1922
1,450,855
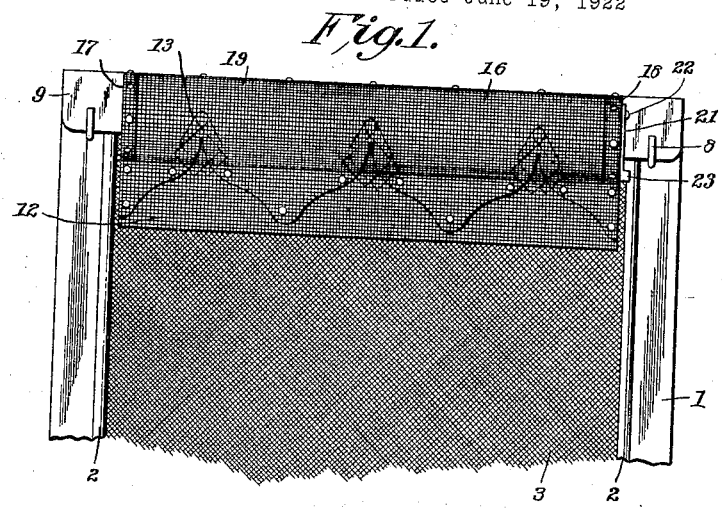
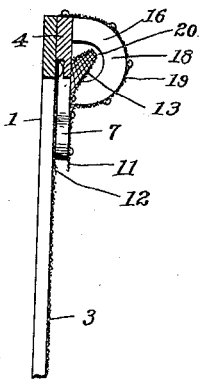
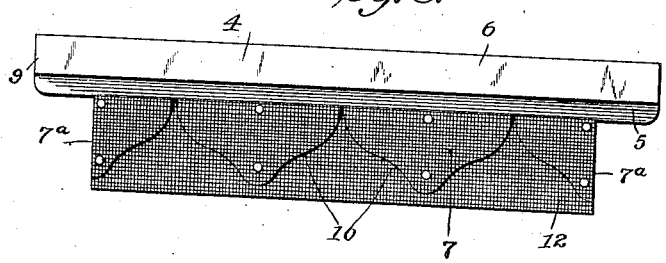
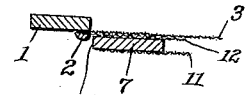
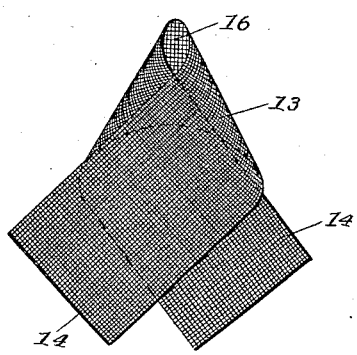
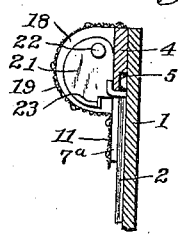
Inventor
James W. Hildreth,
By
Attorney Patented Apr. 3, 1923.

1,450,855

UNITED STATES PATENT OFFICE.

JAMES W. HILDRETH, OF MARION, OHIO, ASSIGNOR OF ONE-HALF TO WARD C. HUFFORD, OF MARION, OHIO.

FLYTRAP.

Application filed June 19, 1922. Serial No. 569,188.

*To all whom it may concern:*

Be it known that I, JAMES W. HILDRETH, a citizen of the United States, residing at Marion, in the county of Marion and State of Ohio, have invented new and useful Improvements in Flytraps, of which the following is a specification.

The invention relates to improvements in fly traps.

The object of the present invention is to provide a simple, practical and efficient fly trap of strong, durable and inexpensive construction designed for use on door, window and other screens and capable of being readily applied to the same without necessitating any alterations in the construction thereof and adapted to cause the flies crawling up the screen to trap themselves.

A further object of the invention is to provide a fly trap of this character adapted to be easily and quickly removed from a screen frame for destroying the trapped flies or for any other purpose.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings, in which like characters of reference designate corresponding parts in the several views:—

Figure 1 is an elevation of a fly trap constructed in accordance with this invention and is shown applied to a fly screen.

Figure 2 is a vertical sectional view of the same, the section being taken through one of the hollow conical trap members.

Figure 3 is a rear elevation of the fly trap detached.

Figure 4 is a horizontal sectional view through one side of the fly trap and fly screen.

Figure 5 is a detail sectional view illustrating the construction of the locking devices for securing the fly trap to the fly screen.

Figure 6 is a detail view of one of the hollow conical trap members.

In the accompanying drawing, in which is illustrated the preferred embodiment of the invention, 1 designates a rectangular screen frame provided at the inner edges of the frame bars or members with interior projecting beads 2 overlapping and securing the marginal edges of the screen material or wire netting 3 to the screen frame. The fly screen frame may consist of a door, or window or other fly screen and the fly trap is mounted upon the upper portion thereof and interlocked with the top and side beads 2 of the fly screen. The fly trap comprises a rear support 4 having a groove 5 adapted to receive and fit the top bead for holding the trap against vertical movement on the fly screen. The said rear support is composed of a bar 6 and a transverse series of tapered blocks 7 attached to the lower edge of the bar 6, which is recessed at the lower edge contiguous to the blocks to form therewith the said bead receiving groove 5. The blocks project rearwardly at the said recesses to form the lower wall of the groove 5 and the end blocks are provided with straight vertical outer side edges 7ª which fit between the vertical side beads 2 of the screen frame. By this construction the rear support is interlocked with the screen frame and held against vertical and lateral movement thereof and it is detachably secured to the screen frame by means of substantially L-shaped locking devices 8 mounted on the screen frame at the sides thereof and consisting of stems and projecting arms. The stems form pivots to permit the arms to be turned into and out of engagement with the terminal projecting portions 9 of the bar 6 and when the arms of the locking devices 8 are turned down out of engagement with the said terminal portions 9 of the bar 6 the trap is adapted to be removed from the screen frame and may be replaced thereon.

The inner opposed side edges 10 of the tapered blocks converge upwardly and form flaring entrances to the fly trap and the blocks have secured to them inner and outer transverse strips 11 and 12 of screen material. These transverse strips 11 and 12 of screen material bridge the spaces between the blocks and confine the flies crawling up the screen between the converging edges 10 and cause the flies to pass upwardly through the contracted portions of the tapering spaces between the blocks and enter hollow conical trap members 13 constructed of screen material and mounted upon the rear support 4 and located within and projecting from the support at an upward inclination. The hollow conical trap members are provided at the bottom and sides with marginal attaching portions 14 which are secured to the rear support and the said trap members are provided at their upper ends or apexes with openings 16 to permit the flies to pass from the trap members into the receptacle 16. The receptacle 16 consists of segmental end walls 17 and 18 and a connecting wall 19 of screen material. The connecting wall of screen material is of substantially semi-cylindrical form and is suitably secured to the grooved edges of the walls and is preferably formed integral with the front strip 12 of screen material. The end wall 18 is provided with an opening 20, which is normally covered by a pivoted closure plate 21 constructed of sheet metal or other suitable material and secured to the end wall 18 at the upper portion thereof by a pivot 22 and provided at the lower portion with a projecting lug 23 forming a grip or handle by means of which the pivoted closure may be readily swung open and returned to its closed position covering the opening 20 of the end wall 18.

The flies crawling up the fly screen will pass into the flaring entrances to the fly trap and be directed by the upwardly converging walls thereof to the conical trap members from which the flies will emerge into the trap receptacle 16. The fly trap, when a sufficient number of flies have been captured, may be readily removed to enable the flies to be destroyed by scalding or other means and the dead flies may be readily emptied through the opening 20. By this means the trap may be maintained in a sanitary condition. The trap presents a neat and artistic appearance and will not be objectionable when applied to either a screen door or a window screen.

What is claimed is:

1. A fly trap including a rear support adapted to fit against a fly screen and provided with a groove arranged to receive the top bead of the screen frame, said rear support being also provided with a transverse series of tapered blocks fitting between the side beads of the fly screen and forming intervening tapered entrances, the said groove and the block interlocking the rear support with the fly screen against vertical and lateral movement, fastening means for detachably securing the rear support to the screen frame, a receptacle mounted on the rear support, and conical trap members located within the receptacle and communicating with the tapered entrances and provided with outlets communicating with the interior of the said receptacle.

2. A fly trap comprising a rear support adapted to be secured to a fly screen and provided with depending tapered blocks having upwardly converging opposed edges forming flaring entrances, screen material bridging the spaces between the blocks, a trap receptacle extending along and mounted upon the rear support, and inclined hollow conical trap members mounted upon the rear support and overlapping the upper ends of the spaces between the tapered blocks and located within the said trap receptacle and having outlets communicating with the interior thereof.

3. A fly trap adapted to be mounted on a fly screen and including a rear support comprising a horizontal bar and a transverse series of tapered blocks arranged at the lower edge of the said bar and having opposed upwardly converging side edges, strips of screen material secured to the blocks and bridging the spaces between the said converging edges, end walls mounted on the rear support, one of the end walls being provided with an opening and having a closure for the same, the connecting wall of screen material secured to the end walls and forming a trap receptacle, and hollow conical trap members mounted on the rear support and arranged at an inclination and located within the trap receptacle and having lower marginal attaching portions and provided at their apexes with outlets communicating with the interior of the trap receptacle.

4. The combination with a fly screen having a screen frame and provided at the inner edge thereof with a bead, of a fly trap comprising a rear support having a longitudinal groove to receive the top bead of the fly screen and provided with a transverse series of depending tapered blocks fitted between the side beads of the fly screen, said support having terminal portions projecting over the side portions of the fly screen, pivoted fastening devices mounted on the fly screen and movable to engage them with and disengage them from the terminal projecting portions of the said bar, a trap receptacle mounted upon the upper portion of the rear support, screen material bridging the spaces betwen the tapered blocks, and hollow conical trap members mounted upon the support at an inclination and communicating at their base portions with the spaces between the blocks and provided at their apexes with outlets communicating with the interior of the trap receptacle.

In testimony whereof I have hereunto set my hand.

JAMES W. HILDRETH.